United States Patent [19]

Tucoulat et al.

[11] 4,260,504

[45] Apr. 7, 1981

[54] POLYOXYALKYLENE TRIAL ADDITIVES FOR MINIMIZING DEPOSITS FROM AQUEOUS HEAT-EXCHANGE FLUIDS

[75] Inventors: Marcel J. Tucoulat, Martiques; Jacques Lonchampt, Montbeliard, both of France

[73] Assignee: Naphtachimie, Paris, France

[21] Appl. No.: 24,655

[22] PCT Filed: Mar. 22, 1979

[86] PCT No.: PCT/FR78/00008

§ 371 Date: Mar. 22, 1979

§ 102(e) Date: Mar. 22, 1979

[87] PCT Pub. No.: WO79/00067

PCT Pub. Date: Feb. 22, 1981

[22] Filed: Mar. 22, 1979

[30] Foreign Application Priority Data

Jul. 27, 1977 [FR] France .................... 77 23192

[51] Int. Cl.³ .................... C09K 5/00; C02B 5/06
[52] U.S. Cl. .................... 252/73; 252/180; 568/624
[58] Field of Search .................... 252/73, 75, 180; 422/14, 13; 210/58; 568/624

[56] References Cited

U.S. PATENT DOCUMENTS

| | | | |
|---|---|---|---|
| 2,425,755 | 8/1947 | Roberts et al. | 252/79 X |
| 2,425,845 | 8/1947 | Toussaint et al. | 252/79 X |
| 2,602,780 | 7/1952 | Zisman et al. | 252/73 |
| 2,657,181 | 10/1955 | Van Horn et al. | 568/624 X |
| 2,733,272 | 1/1956 | Horsley et al. | 568/624 |
| 2,757,142 | 7/1956 | Ryznar | 252/73 |
| 2,831,034 | 4/1958 | Pruitt et al. | 568/624 |
| 2,948,757 | 8/1960 | Pruitt et al. | 568/624 |
| 3,578,589 | 5/1971 | Hwa et al. | 210/58 |
| 3,666,404 | 5/1972 | Hwa et al. | 252/75 X |
| 3,962,119 | 6/1976 | Cosentino et al. | 252/180 X |

*Primary Examiner*—Harris A. Pitlick
*Attorney, Agent, or Firm*—McDougall, Hersh & Scott

[57] ABSTRACT

PCT No. PCT/FR78/00008 Sec. 371 Date Mar. 22, 1979 Sec. 102(e) Date Mar. 22, 1979 PCT Filed July 10, 1978

The invention concerns a process for preventing the formation of deposits on the walls of the heating or cooling circuits of heat exchangers in which an aqueous heat-exchange liquid circulates.

This process comprises mixing with the heat-exchange liquids from about 0.3 to about 5% by weight of a product of polyaddition of ethylene oxide and propylene oxide on a monohydric alcohol, water, a diol or a triol, the ethylene oxide representing from 60% to 90% by weight of the fixed alkylene oxides.

This process can be used in particular in internal combustion engine cooling circuits.

7 Claims, No Drawings

POLYOXYALKYLENE TRIOL ADDITIVES FOR MINIMIZING DEPOSITS FROM AQUEOUS HEAT-EXCHANGE FLUIDS

The present invention concerns a process for preventing the formation of deposits on the walls of the heating or cooling circuits of heat exchangers in which the heat-exchange fluid comprises an aqueous liquid such as water or water to which a glycol-base anti-freeze has been added.

It is known that, in heat exchangers which employ an aqueous liquid, in particular in the cooling circuits of internal combustion engines, it is often found that solid deposits are formed on the walls of the heat exchangers, in particular in the hot regions and especially in the vicinity of the cylinder head gaskets. These deposits, which have a very detrimental effect on good heat exchange, may be of widely varying nature; in particular they may comprise scale originating from the salts which are dissolved in the waters used, or they may comprise deposits of varying natures originating either from corrosion inhibiting agents or from other additives which are present in the anti-freezes.

Various means have already been proposed for removing the existing scale in cooling circuits which use aqueous liquids. The chemical means which use acids suffer from the disadvantage of causing corrosion of the metals forming the circuits, while the purely mechanical means require the installations to be dismantled.

In order to prevent the formation of certain deposits, it is also known that chemical compounds complexing metals such as calcium or magnesium, in particular phosphates or salts of ethylenediamine-tetra-acetic acid, may be added to the aqueous heat-exchange liquids. However, the action of these complexing agents is not general and makes it possible to prevent the formation of only some deposits.

The applicants have now discovered highly effective additives for preventing the formation of deposits in the cooling or heating circuits which use aqueous heat-exchange liquids capable of containing glycol-based anti-freezes and/or various compounds such as corrosion inhibiting agents; these additives do not give rise to any danger of corrosion in respect of the metal walls of the circuit and do not affect either the boiling temperature or the freezing point of the liquids containing anti-freeze agents.

The invention concerns a process for preventing the formation of deposits on the walls of the cooling or heating circuits of heat exchangers using an aqueous heat-exchange liquid containing an anti-freeze based on a glycol such as ethyleneglycol or propyleneglycol and a product of polyaddition of ethylene oxide and propylene oxide, said process being characterised in that the heat-exchange liquid contains from about 0.3 to about 5% by weight of an additive formed by a product of polyaddition of ethylene oxide and propylene oxide on a monohydric alcohol, water, a diol or a triol, the ethylene oxide representing from 60% to 90% by weight of the fixed alkylene oxides, the mean molecular weight of the product of polyaddition of ethylene oxide and propylene oxide on a monohydric alcohol or a triol being from 500 to 4,000 and the mean molecular weight of the product of polyaddition of ethylene oxide and propylene oxide on water or on a diol being from 500 to 15,000 and preferably from 500 to 8,000.

The water-base heat-exhange liquids are also capable of containing various compounds such as corrosion inhibiting agents.

When using a heat-exchange liquid containing an anti-freeze, it may be advantageous to add the polyaddition product to the anti-freeze, in a proportion of about 1% to about 15% by weight, prior to mixing the anti-freeze with the water.

The anti-freezes which may be used in accordance with the invention essentially comprise monoethylene glycol or monopropylene glycol, to which there are added small proportions of the additives currently employed such as corrosion inhibiting agents, for example alkaline-earth metal salts such as benzoates, nitrites, borates or phosphates.

The ethylene oxide and propylene oxide polyaddition product may be produced by reaction of a mixture of said oxides on a monohydric alcohol such as saturated aliphatic alcohol containing from 1 to 6 carbon atoms, on water, on a diol, or on a triol, such as glycerine or trimethylolpropane.

It is also possible to operate by the reaction of ethylene oxide and propylene oxide in successive sequences, or successively to effect additions of ethylene oxide, propylene oxide and/or mixtures of ethylene oxide or propylene oxide.

The polyaddition reaction of ethylene oxide and propylene oxide on the compounds with a hydroxyl group, as mentioned above, may easily be carried out using the methods which are already well known per se, by means for example of basic catalysts such as potash. When the reaction is concluded, the catalyst may be neutralised by an acid or the salt formed may if necessary be removed by filtration.

The mean molecular weights of the polyaddition compounds, calculated by way of measurement of their hydroxyl index, may vary within wide limits. The mean molecular weights are from 500 to 4,000 in the case of polyaddition of ethylene oxide and propylene oxide on a monohydric alcohol or on a triol, and from 500 to 15,000 and preferably from 500 to 8,000 in the case of polyaddition of said oxides on water or on a diol.

The additives according to the invention may be used in any cooling or heating circuits employing aqueous heat-exchange liquids comprising water or mixtures of water and glycol-based anti-freezes, said liquids also being capable of containing various compounds such as corrosion inhibiting agents; they may be used in particular in the cooling circuits of internal combustion engines, central heating circuits, boilers and any heat exchangers.

EXAMPLE 1

Preparation of an additive A according to the invention

A mixture of 15.4 moles of ethylene oxide and 4 moles of propylene oxide is reacted, in the presence of potash, on 1 mole of water at a temperature of 135° C. When the reaction is concluded, the potash is neutralised by the stoichiometric amount of hydrochloric acid. The potassium chloride formed is removed by filtering. This results in a liquid with a mean molecular weight of 900, ethylene oxide representing 75% by weight of the alkylene oxides which reacted on the water. The mean molecular weight of the additive A was calculated from the value of the hydroxyl index ($I_{OH}$) of additive A, as being 124, by using the following formula:

Mean molecular weight $= (56000 \times F)/I_{OH}$

F being the group number of the polyol, being 2 in the case of a diol. In the case of a monol, F would be 1, while in the case of a triol, F would be 3.

Accelerated test carried out on heat-exchange liquids

In order rapidly to determine the aptitude of a water-based heat-exchange liquid to produce deposits in the circuits in which it may be used, the following test method was used:

A cup containing 50 ml of the liquid to be studied is placed in a drying oven which is maintained at a temperature of 160° C. The nature of the residue when the weight of the product reaches a value that remains constant, is examined. The production of a dry solid residue, which may possibly be crystalline, or a pasty residue containing solid particles, corresponds to a liquid which is capable of causing substantial deposits in the circuits in which it may be used. In contrast, if the residue is liquid, there is little danger of deposits being formed in the circuits, even when the liquid is highly viscous. Indeed, when 50 ml of the liquid to be studied is added to the cup containing the residue, it is found that, when the residue is liquid, it mixes into the liquid to be studied, without giving rise to the formation of a precipitate; when the residue is solid or pasty, this does not substantially dissolve in the liquid to be studied, even after having been maintained at a temperature of 80° C. for 1 hour.

The anti-freeze used in the following tests is ethyleneglycol-based and contains sodium nitrite and benzoate as corrosion inhibiting agents; its composition and its characteristics are in accordance with British Standard 3151.

TEST NO. 1

The following anti-freeze composition is prepared by mixing:
Anti-freeze: 95% by weight
Additive A: 5% by weight Distilled water is added to this mixture, in a proportion of 40% by volume of the mixture for 60% by volume of water.

When the resulting liquid is subjected to the accelerated test referred to hereinbefore, the residue obtained is a viscous liquid which has the micrographic appearance of an amorphous product.

By way of comparison, the mixture of 40 volumes of anti-freeze without additive A and 60 volumes of distilled water results, in the same accelerated test, in a dry, adherent deposit which is of fibrous appearance.

TEST NO. 2

40 parts by volume of distilled water and 60 parts by volume of a mixture comprising 95 parts by weight of anti-freeze and 5 parts by weight of additive A are mixed together.

2% of calcium carbonate is dissolved in the resulting mixture.

The resulting liquid is subjected to the accelerated test, producing a perfectly amorphous, viscous liquid residue.

By way of comparison, the same liquid prepared from an anti-freeze without any additive A results, in the same accelerated test, in a dry, friable, adherent deposit which is of fibrous micrographic appearance.

TEST NO. 3

The following mixture is prepared:
Calcium carbonate: 2% by weight
Additive A: 5% by weight
Distilled water: 93% by weight When this liquid is subjected to the accelerated test, the result is a deposit which is greasy to the touch, without much crystallisation.

By way of comparison:

A quantity of water containing 2% of calcium carbonate without additive A, when subjected to the same accelerated test, resulted in a perfectly dry residue of polyhedral crystals.

EXAMPLE 2

A series of tests is performed on various heat-exchange liquids. In a first phase, there are prepared anti-freeze compositions containing 95% by weight of the same ethyleneglycol-based anti-freeze as in Example 1, and 5% by weight of additives produced by the polyaddition of ethylene oxide and propylene oxide on different alcohols, diols or polyols.

Heat-exchange liquids are then produced by mixing 30 volumes of each of these anti-freeze compositions with 70 volumes of a non-demineralised water having a French hydrotimetric degree of 25.

Each of these liquids is subjected to the accelerated test described in the previous example. In the description of the tests given hereinafter, it is found that the additives according to the invention make it possible to produce liquid residues. In contrast, some polyaddition products used, such as those in which ethylene oxide represents less than 60% by weight of the fixed alkylene oxides or those produced from a hexol, are not effective, as the residues produced are solid in such cases.

TEST NO. 1

This test was performed by way of comparison on a mixture of water and anti-freeze containing 30% by volume of anti-freeze without additive. The residue obtained is solid. In the following tests, the percentage of ethylene oxide specified represents a percentage by weight with respect to the total of the alkyleneoxides fixed on the different alcohols, diols or polyols.

TEST NO. 2

The additive used is the product of polyaddition of a mixture of ethylene oxide and propylene oxide on n-butanol, of mean molecular weight 1,000; ethylene oxide; 50%—pasty residue.

TEST NO. 3

The additive used is the product of polyaddition of a mixture of ethylene oxide and propylene oxide on diethyleneglycol, of mean molecular weight 8,000; ethylene oxide: 75%—liquid residue.

TEST NO. 4

The additive used is the product of polyaddition of a mixture of ethylene oxide and propylene oxide on glycerol, of mean molecular weight 800; ethylene oxide: 50%—solid residue.

TEST NO. 5

Same type of additive as in Test No. 4, but with a mean molecular weight of 3,000; ethylene oxide: 50%—solid residue.

TEST NO. 6

Same type of additive as in Test No. 4 but with a mean molecular weight of 3,000; ethylene oxide: 60%—liquid residue.

TEST NO. 7

Same type of additive as in Test No. 4 but with a mean molecular weight of 800; ethylene oxide: 75%—liquid residue.

TEST NO. 8

Same type of additive as in Test No. 4 but with a mean molecular weight of 3,000; ethylene oxide: 75%—liquid residue.

TEST NO. 9

Same type of additive as in Test No. 4 but with a mean molecular weight of 3,000; ethylene oxide: 80%—liquid residue.

TEST NO. 10

The additive used is the product of sequential polyaddition of a mixture of ethylene oxide and propylene oxide, then ethylene oxide, and finally propylene oxide, on glycerol, with a mean molecular weight of 3,000; ethylene oxide: 75%—liquid residue.

TEST NO. 11

The additive used is the product of sequential polyaddition of a mixture of ethylene oxide and propylene oxide, then propylene oxide, and finally ethylene oxide, on glycerol, with a mean molecular weight of 1,200; ethylene oxide: 75%—liquid residue.

TEST NO. 12

Same type of additive as in Test No. 11 but with a mean molecular weight of 3,000; ethylene oxide: 75%—liquid residue.

TEST NO. 13

The additive used is the product of sequential polyaddition of a mixture of ethylene oxide and propylene oxide, then propylene oxide on glycerol, with a mean molecular weight of 3,000; ethylene oxide: 60%—liquid residue.

TEST NO. 14

The additive used is the product of polyaddition of a mixture of ethylene oxide and propylene oxide on trimethylolpropane, with a mean molecular weight of 1,000; ethylene oxide: 50%—very thick pasty residue.

TEST NO. 15

Same type of additive as in Test No. 14, but with a mean molecular weight of 3,000; ethylene oxide: 50%—very thick pasty residue.

TEST NO. 16

Same type of additive as in Test No. 14 but with a mean molecular weight of 3,000; ethylene oxide: 75%—liquid residue.

TEST NO. 17

The additive used is a product of polyaddition of a mixture of ethylene oxide and propylene oxide on sorbitol, with a mean molecular weight of 1,000; ethylene oxide: 50%—solid residue.

TEST NO. 18

Same type of additive as in Test No. 17 but with a mean molecular weight of 3,000; ethylene oxide: 50%—very thick pasty residue.

TEST NO. 19

Same type of additive as in Test No. 17 but with a mean molecular weight of 3,000; ethylene oxide: 75%—solid residue.

TEST NO. 20

Same type of additive as in Test No. 17 but with a mean molecular weight of 6,000; ethylene oxide: 75%—very thick pasty residue.

EXAMPLE 3

Tests performed on cooling circuits of automobile engines

The polyaddition product with a mean molecular weight of 900, as described in Example 1, is added in a proportion of 10% by weight to an ethyleneglycol-base anti-freeze conforming to British Standard 3151.

40 parts by volume of the resulting anti-freeze composition is then mixed with 60 parts by volume of a non-demineralised water having a French hydrotimetric degree of 25.

Two vehicles, whose engines were filled with the resulting cooling liquid, covered respectively 60,000 and 75,000 km, over a period of 15 months.

No deposit was found on the walls of the cooling circuit after dismantling.

In contrast, mishaps due to the presence of deposits were found on the circuits of other vehicles of the same type which gave the same service but in which the cooling circuits had been filled with a mixture of water and anti-freeze containing 40% by volume of anti-freeze to which the additive according to the invention had not been previously added.

We claim:

1. A process for preventing the formation of deposits on the walls of the heating or cooling circuits of heat exchangers using an aqueous heat-exchange liquid containing an anti-freeze based on a glycol, said process being characterised in that addition is made to the heat-exchange liquid of from about 0.3 to about 5% by weight of a product of polyaddition of ethylene oxide and propylene oxide on a triol, the ethylene oxide representing from 60% to 90% by weight of the fixed alkylene oxides, the mean molecular weight of the product of polyaddition of ethylene oxide and propylene oxide on a triol being from 500 to 4,000.

2. A process as claimed in 1 wherein the ethylene oxide and propylene oxide polyaddition product is produced by reaction of a mixture of said two alkylene oxides on a triol.

3. A process as claimed in 1 wherein the product of polyaddition of ethylene oxide and propylene oxide on a triol is first added to the anti-freeze in a proportion of from 1 to 15% by weight, before the anti-freeze is mixed with water.

4. A process as claimed in 1 wherein the heat-exchange liquid contains corrosion inhibiting agents.

5. A process as claimed in claim 1 in which the glycol is selected from the group consisting of ethyleneglycol and propyleneglycol.

6. As a novel industrial product, a heat exchange liquid composition comprising an aqueous solution containing from about 0.3 to about 5% by weight of the polyaddition product as defined in claim 1, 1 to 15% by weight of an anti-freeze based on a glycol, and corrosion inhibiting agents.

7. A product as claimed in claim 6 in which the glycol is selected from the group consisting of ethyleneglycol and propyleneglycol.

* * * * *